United States Patent
Kim et al.

(10) Patent No.: US 9,364,128 B2
(45) Date of Patent: Jun. 14, 2016

(54) ROBOT CLEANER AND CONTROLLING METHOD OF THE SAME

(75) Inventors: Yiebin Kim, Seoul (KR); Seung min Baek, Seoul (KR); Yoojin Choi, Seoul (KR); Vadim Lutsiv, St. Petersburg (RU); Victor Redkov, St. Petersburg (RU); Alexey Potapov, St. Petersburg (RU); Seongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 648 days.

(21) Appl. No.: 13/809,534

(22) PCT Filed: Jul. 5, 2011

(86) PCT No.: PCT/KR2011/004913
§ 371 (c)(1),
(2), (4) Date: Jan. 10, 2013

(87) PCT Pub. No.: WO2012/008702
PCT Pub. Date: Jan. 19, 2012

(65) Prior Publication Data
US 2013/0116826 A1  May 9, 2013

(30) Foreign Application Priority Data

Jul. 12, 2010   (KR) .................. 10-2010-0067113

(51) Int. Cl.
*A47L 11/20* (2006.01)
*G05D 1/02* (2006.01)
*B25J 13/08* (2006.01)

(52) U.S. Cl.
CPC .............. *A47L 11/20* (2013.01); *B25J 13/08* (2013.01); *G05D 1/0246* (2013.01); *G05D 1/0274* (2013.01); *A47L 2201/04* (2013.01); CPC ........... *G05D2201/0203* (2013.01); *Y10S 901/01* (2013.01); *Y10S 901/09* (2013.01); *Y10S 901/47* (2013.01)

(58) Field of Classification Search
CPC ... G06T 7/0024; G06T 7/0028; G06T 7/0042; G06T 7/0065; G06T 7/2033; G05D 1/0246; G05D 1/0251; G05D 1/0253; G05D 2201/0203; B25J 13/088; B25J 13/089; A47L 11/4061; A47L 2201/04
See application file for complete search history.

(56) References Cited

U.S. PATENT DOCUMENTS

| 4,969,036 | A | * | 11/1990 | Bhanu et al. | ............ | 358/105 |
| 2002/0153184 | A1 | * | 10/2002 | Song et al. | ............ | 180/167 |
| 2004/0167667 | A1 | * | 8/2004 | Goncalves et al. | ...... | 700/245 |

(Continued)

FOREIGN PATENT DOCUMENTS

| KR | 10-2002-0081035 A | 10/2002 |
| KR | 10-2007-0066192 A | 6/2007 |

(Continued)

*Primary Examiner* — Andrew W Johns
(74) *Attorney, Agent, or Firm* — Dentons US LLP (57) ABSTRACT

Disclosed are a robot cleaner and a method for controlling the same. The robot cleaner is capable of recognizing a position thereof by extracting one or more feature points having 2D coordinates information with respect to each of a plurality of images, by matching the feature points with each other, and then by creating a matching point having 3D coordinates information. Matching points having 3D coordinates information are created to recognize a position of the robot cleaner, and the recognized position is verified based on a moving distance measured by using a sensor. This may allow a position of the robot cleaner to be precisely recognized, and allow the robot cleaner to perform a cleaning operation or a running operation by interworking the precisely recognized position with a map.

20 Claims, 8 Drawing Sheets

(56) References Cited

U.S. PATENT DOCUMENTS

2008/0065267 A1* 3/2008 Hong et al. .................. 700/245
2010/0070125 A1* 3/2010 Lee et al. ....................... 701/28

FOREIGN PATENT DOCUMENTS

| KR | 10-2010-0031277 A | 3/2010 |
|----|-------------------|--------|
| WO | WO 03/064116 A2 | 8/2003 |

* cited by examiner

ROBOT CLEANER AND CONTROLLING METHOD OF THE SAME

This application is a 35 USC §371 National Stage entry of International Application No. PCT/KR2011/004913 filed on Jul. 5, 2011, and claims priority of Korean Application No. 10-2010-0067113 filed on Jul. 12, 2010, all of which are incorporated by reference in their entirety herein.

TECHNICAL FIELD

The present invention relates to a robot cleaner capable of precisely recognizing a position thereof with using an image detecting unit such as an upper camera, and a controlling method of the same.

BACKGROUND ART

Generally, a robot has been developed for an industrial use, and has managed some parts of factory automation. As the robot is applied to various fields recently, medical robots, space robots, home robots, etc. are being developed.

A representative of the home robot is a robot cleaner, a kind of home electronic appliance capable of performing a cleaning operation by sucking peripheral dust or foreign materials with autonomously moving on a predetermined region. This robot cleaner is provided with a chargeable battery, and is provided with an obstacle sensor for avoiding an obstacle while moving.

In order for the robot cleaner to clean all regions while autonomously moving, a cleaning map has to be made, and a cleaning region on the cleaning map has to be categorized into a region to be cleaned or a region having been cleaned. This determination is generally performed by a precise control performance of the robot cleaner. Generally, the robot cleaner adopts a cheap control sensor with consideration of a product size, the cost, and so on.

DISCLOSURE OF INVENTION

Technical Problem

Therefore, an object of the present invention is to provide a robot cleaner capable of detecting a plurality of images with using an image detecting unit such as an upper camera, and capable of creating a matching point having three-dimensional (3D) coordinates information by extracting one or more feature points having two-dimensional (2D) coordinates information.

Another object of the present invention is to provide a robot cleaner capable of recognizing a position thereof by creating a matching point having three-dimensional (3D) coordinates information, the matching point created by extracting one or more feature points having 2D coordinates information with respect to each of a plurality of images, and then by matching the extracted feature points with each other.

Still another object of the present invention is to provide a robot cleaner capable of precisely recognizing a position thereof based on a matching point having three-dimensional (3D) coordinates information, and a controlling method of the same.

Yet still another object of the present invention is to provide a robot cleaner capable of precisely recognizing a position thereof by verifying a recognized position based on a matching point having three-dimensional (3D) coordinates information, and based on a moving distance measured with using a sensor, and a controlling method of the same.

Solution to Problem

To achieve these and other advantages and in accordance with the purpose of the present invention, as embodied and broadly described herein, there is provided a robot cleaner, comprising: an image detecting unit configured to detect a plurality of images by capturing peripheral circumstances; a feature point extracting unit configured to extract one or more feature points having 2D coordinates information with respect to each of the plurality of images; a feature point matching unit configured to match the feature points with each other by comparing the 2D coordinates information of the feature points with each other; a control unit configured to create a matching point having 3D coordinates information based on a matching result through the feature point matching unit, and configured to recognize a position of the robot cleaner based on the created matching point; and a storage unit configured to store therein the matching point having 3D coordinates information. The 2D coordinates information may include a position, an orientation and a descriptor of the feature point on the image, and the descriptor may indicate extraction information of the feature point.

According to another embodiment of the present invention, the control unit of the robot cleaner may include a similarity calculating module configured to calculate a similarity between a plurality of feature points inside two or more images detected through the image detecting unit based on the 2D coordinates information, and configured to recognize a position of the robot cleaner based on feature points having a maximum similarity therebetween. Also, the control unit may further include a predicted position calculating module configured to calculate a predicted position of a feature point of a current image on a next image, based on the matching point stored in the storage unit. The control unit may be configured to verify the position of the robot cleaner recognized based on feature points having a maximum similarity, based on a predicted position calculated by the predicted position calculating module.

According to still another embodiment of the present invention, the robot cleaner may further include a driving unit configured to move the robot cleaner by driving wheels, and a distance measuring unit connected to the wheels and configured to measure a moving distance. The control unit may further include a compensation constant creating module configured to create a compensation constant with respect to the similarity based on the moving distance. The similarity calculating module may be configured to re-calculate the similarity based on the compensation constant, and to recognize a position of the robot cleaner based on feature points having a maximum re-calculated similarity.

According to yet still another embodiment of the present invention, the robot cleaner may further include an obstacle detecting unit configured to detect a peripheral obstacle. The control unit may be configured to create a map based on the obstacle, and to establish (set) a cleaning path or a running path based on the map. The control unit may be configured to correct the cleaning path or the running path based on the position of the robot cleaner, and to perform a cleaning operation based on the corrected cleaning path or to run based on the corrected running path.

To achieve these and other advantages and in accordance with the purpose of the present invention, as embodied and broadly described herein, there is also provided a method for controlling a robot cleaner, the method comprising: an image detecting step of detecting a plurality of images by capturing peripheral circumstances; a feature point extracting step of extracting one or more feature points having 2D coordinates information with respect to each of the plurality of images; a feature point matching step of matching the feature points with each other by comparing the 2D coordinates information of the feature points with each other; a matching point creating step of creating a matching point having 3D coordinates information based on a matching result through a feature point matching unit; and a position recognizing step of recognizing a position of the robot cleaner based on the created matching point. The method may further include a storing step of storing the matching point having 3D coordinates information.

The feature point matching step may include calculating a similarity between the plurality of feature points inside two or more images based on the 2D coordinates information. And, the position recognizing step may include recognizing a position of the robot cleaner based on feature points having a maximum similarity.

According to another embodiment of the present invention, the method for controlling a robot cleaner may further include a predicted position calculating step of calculating a predicted position of a feature point of a current image on a next image, based on the matching point. The position recognizing step may further include verifying the recognized position of the robot cleaner based on the predicted position calculated in the predicted position calculating step.

According to still another embodiment of the present invention, the method for controlling a robot cleaner may further include a moving distance measuring step of measuring a moving distance with using a sensor connected to wheels, and a compensation constant creating step of creating a compensation constant with respect to the similarity based on the moving distance. The position recognizing step may further include re-calculating the similarity based on the compensation constant, and recognizing a position of the robot cleaner based on feature points having a maximum recalculated similarity.

According to yet still another embodiment of the present invention, the method for controlling a robot cleaner may further include an obstacle detecting step of detecting a peripheral obstacle, a map creating step of creating a map based on the obstacle, a path establishing step of establishing a cleaning path or a running path based on the map, a path correcting step of correcting the cleaning path or the running path based on the position of the robot cleaner, and a cleaning or running executing step of executing a cleaning operation or a running operation based on the corrected cleaning path or running path.

Advantageous Effects of Invention

The robot cleaner and the controlling method of the same according to the present invention may have the following advantages.

Firstly, the robot cleaner may precisely recognize a position thereof based on one or more feature points having 2D coordinates information and extracted from each of a plurality of images.

Secondly, the robot cleaner may precisely recognize a position thereof based on a matching point having 3D coordinates information created based on one or more feature points having 2D coordinates information.

Thirdly, the robot cleaner may precisely recognize a position thereof based on a matching point having 3D coordinates information and a moving distance measured by a cheap sensor, and may verify the recognized position.

Fourthly, the robot cleaner may perform a cleaning operation or a running operation by interworking a precisely recognized position with a map. This may enhance efficiency of a cleaning operation or a running operation, and efficiency of a system.

BEST MODE FOR CARRYING OUT THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Figure 3:
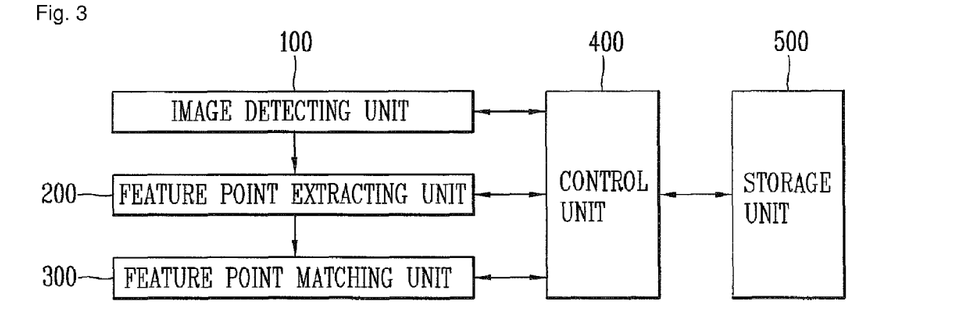
FIGS. 3 to 5 are block diagrams schematically illustrating a configuration of a robot cleaner according to the present invention.

Referring to FIG. 3, a robot cleaner according to one embodiment of the present invention comprises an image detecting unit 100, a feature point extracting unit 200, a feature point matching unit 300, a control unit 400, and a storage unit 500. The image detecting unit 100 is configured to detect a plurality of images by capturing peripheral circumstances. The feature point extracting unit 200 is configured to extract one or more feature points having 2D coordinates information with respect to each of the plurality of images. The feature point matching unit 300 is configured to match the feature points with each other by comparing the 2D coordinates information of the feature points with each other. The control unit 400 is configured to create a matching point having 3D coordinates information based on a matching result through the feature point matching unit 300, and configured to recognize a position of the robot cleaner based on the created matching point. And, the storage unit 500 is configured to store therein the matching point having 3D coordinates information.

Figure 1:
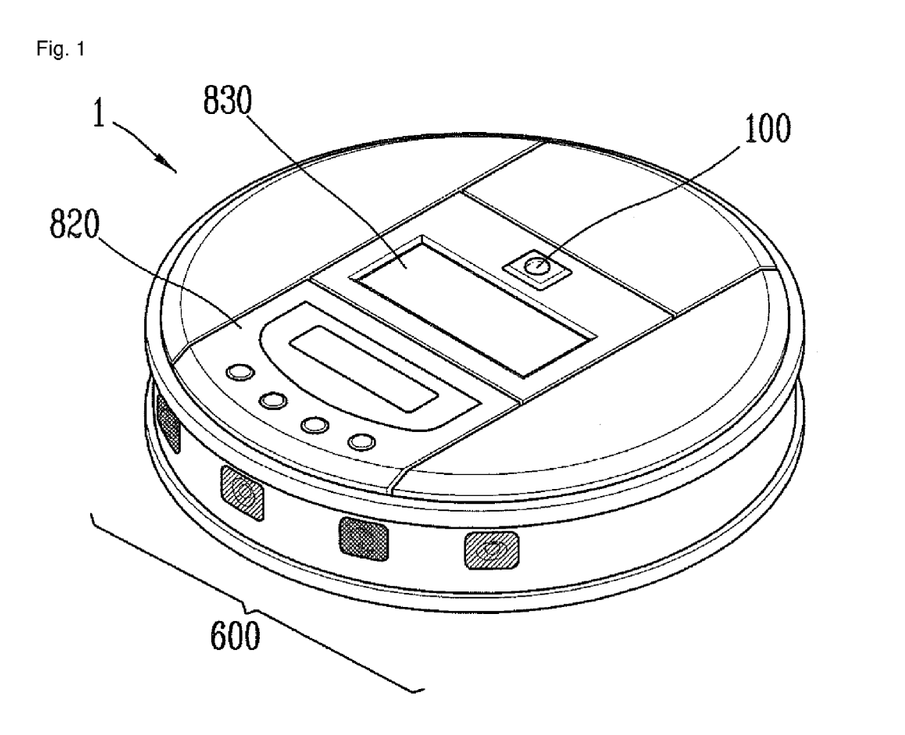
FIG. 1 is a perspective view schematically illustrating the appearance of a robot cleaner according to the present invention.
Figure 2:
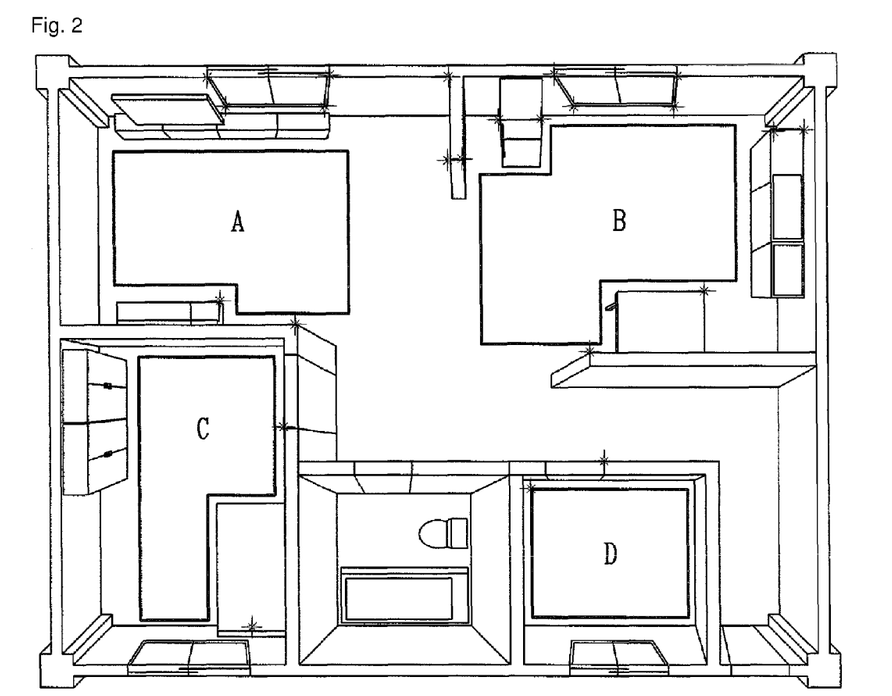
FIG. 2 is a view for explaining an operation to extract feature points according to the present invention.

As shown in FIG. 1, the image detecting unit 100 is implemented as an upper camera installed above the robot cleaner, and configured to detect an upper image by capturing an upper side. Alternatively, the image detecting unit 100 may be implemented as a front camera configured to detect a front image by capturing a front side. Referring to FIG. 2, the feature points indicate images detected by the image detecting unit 100, the images such as a ceiling positioned at an upper side, a fluorescent lamp positioned at a front side and an interior structure. The image detecting unit 100 may include a lens. As the lens, preferably used is a lens having a wide viewing angle so that all regions of a ceiling can be captured. For instance, the lens may have a viewing angle more than 160°.

The feature point extracting unit 200 is configured to extract one or more feature points having 2D coordinates information with respect to each of the plurality of images. Here, the 2D coordinates information includes feature point information consisting of a position, an orientation and a descriptor of the feature point on the image, and the descriptor indicates extraction information of the feature point. The descriptor indicates a characteristic of the feature point, which corresponds to a matrix of a predetermined size and including the feature point on the image. The descriptor includes a type or a shape of a structure at a position extracted from the image.

The feature points have a distance therebetween through which a similarity therebetween is determined. More concretely, the feature points have a large similarity when a distance therebetween is short. On the other hand, the feature points have a small similarity when a distance therebetween is long. The feature points may be represented as $(x_{1,i}, y_{1,i})$ or $(x_{2,i}, y_{2,i})$, for instance. Here, the distance ($\Delta$) between the feature points may be expressed as the following Math Figure 1.

MathFigure 1

$$\Delta = \sqrt{(x_{1,i}-x_{2,i})^2 + (y_{1,i}-y_{2,i})^2} \quad [\text{Math.1}]$$

The feature point matching unit 300 is configured to match the feature points with each other by comparing the 2D coordinates information of the feature points with each other. For instance, when a distance ($\Delta$) between the feature points acquired by the Math Figure 1 is less than a predetermined distance, the feature point matching unit 300 determines that the feature points are same and matches the feature points with each other.

The control unit 400 is configured to create a matching point having 3D coordinates information based on a matching result through the feature point matching unit 300. And, the storage unit 500 is configured to store therein the matching point having 3D coordinates information.

The control unit 400 recognizes a position of the robot cleaner based on the matching point. Firstly, the control unit 400 calculates a similarity between feature points based on a distance between the feature points, with using 2D coordinates information of the feature points. Also, the control unit 400 matches the feature points with each other based on the calculated similarity, and recognizes a position change of the robot cleaner based on a matching result between the feature points. Then, the control unit 400 verifies the matching result between the feature points based on 3D coordinates information of the matching point.

The control unit 400 may create a conversion matrix by using the matching points. By using the created conversion matrix, the robot cleaner converts feature points having 2D coordinates information and contained in a plurality of images, into corresponding matching points having 3D coordinates information. The storage unit 500 may further store therein the conversion matrix created by using the matching points. The control unit 400 converts a 2D coordinates system into a 3D coordinates system by using the conversion matrix. Then, the control unit 400 verifies the matching result between the feature points based on 2D coordinates information, with using matching points on the converted 3D coordinates system.

The storage unit 500 may further store therein information on obstacles detected while the robot cleaner moves or performs a cleaning operation. Also, the storage unit 500 may store therein a plurality of images detected by the image detecting unit 100. The storage unit 500 is preferably implemented as a non-volatile memory. The non-volatile memory (NVM, NVRAM) indicates a storage device capable of maintaining stored information even when no power is supplied. The non-volatile memory includes ROM, a flash memory, a magnetic computer memory device (e.g., hard disk, diskette drive and magnetic tape), an optical disk drive, magnetic RAM (MRAM), phase-change RAM (PRAM), etc. And, the storage unit 700 may further store therein moving information, cleaning information, etc. of the robot cleaner within a cleaning region, and may further include a program for driving the robot cleaner.

Figure 6:
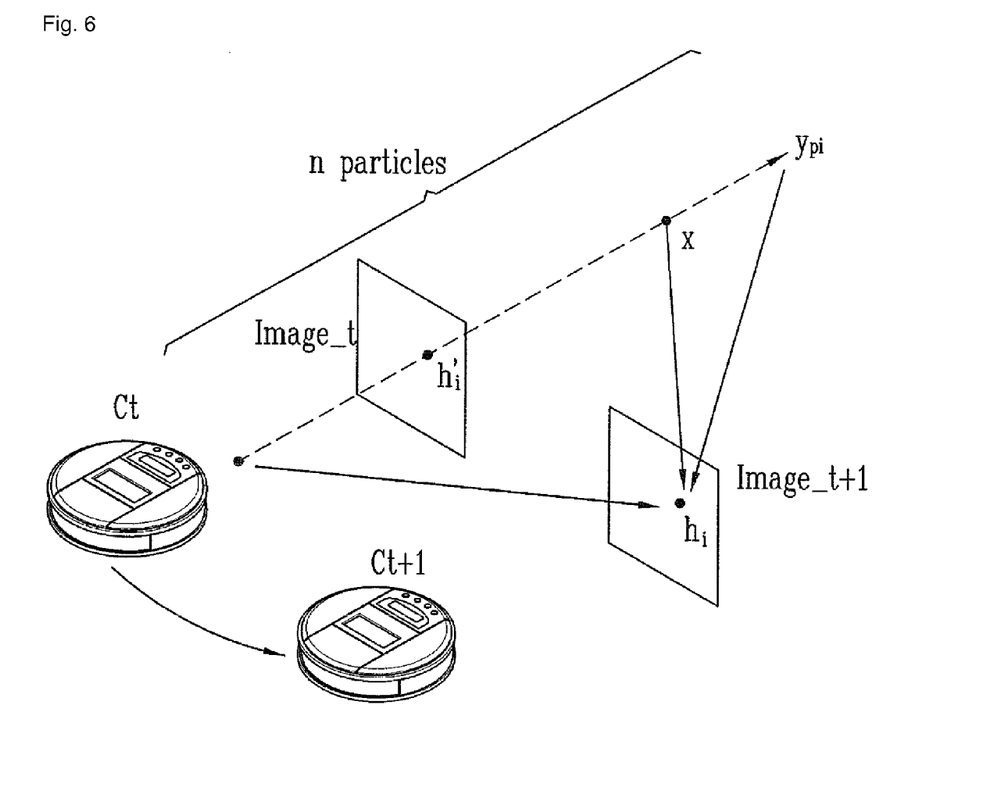
FIG. 6 is a view for explaining an operation to create a matching point having 3D coordinates information according to the present invention.

FIG. 6 is a view illustrating an example to create matching points having 3D coordinates information by the robot cleaner. Referring to FIG. 6, the robot cleaner assumes a feature point ($h'_i$) which exists on a previous image (Image_t), and a virtual line ($y_{pi}$) including a central point of the image detecting unit 100. Then, the robot cleaner creates a finite number (n) of particles on the virtual line. Once the image detecting unit 100 captures a substantial feature point (X) at peripheral circumstances at a specific time (t), the substantial feature point (X) is expressed as a feature point ($h'_i$) which exists on a previous image (Image_t). Once a central point of the image detecting unit 100 is connected to the feature point of the image, the substantial feature point (X) exists on the virtual line. Accordingly, the particle includes the substantial feature point (X), and the number of particles is limited for calculative convenience.

Figure 5:
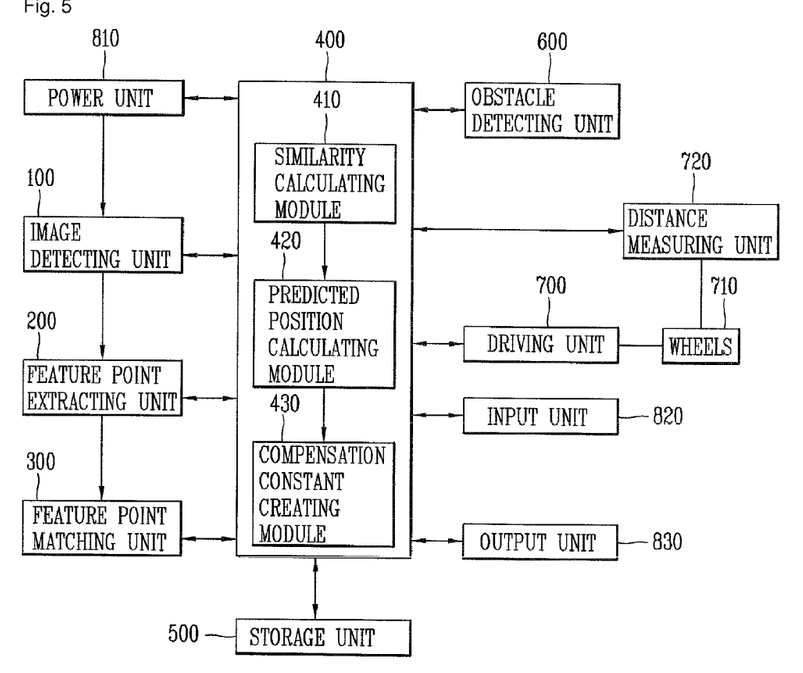

Referring to FIG. 5, a robot cleaner according to another embodiment of the present invention comprises an image detecting unit 100, a feature point extracting unit 200, a feature point matching unit 300, a control unit 400 and a storage unit 500. The same explanations as those in the aforementioned embodiment will be omitted. The control unit 400 includes a similarity calculating module 410 configured to calculate a similarity between a plurality of feature points inside two or more images detected through the image detecting unit 100 based on the 2D coordinates information. The control unit 400 is configured to recognize a position of the robot cleaner based on feature points having a maximum similarity. The similarity may be calculated based on a distance calculated by the Math Figure 1.

Also, the control unit 400 may further include a predicted position calculating module 420 configured to calculate a predicted position of a feature point of a current image on a next image, based on the matching point stored in the storage unit. The control unit 400 may be configured to verify the position of the robot cleaner recognized based on the feature points having a maximum similarity, based on the predicted position calculated by the predicted position calculating module 420.

The control unit 400 recognizes a position of the robot cleaner based on the matching point. The similarity calculating module 410 is configured to calculate a similarity between a plurality of feature points based on a distance between the feature points by using 2D coordinates information of the feature points. The control unit 400 matches the feature points with each other based on the similarity, thereby recognizing a position change of the robot cleaner. Then, the predicted position calculating module 420 calculates a predicted position of a feature point of a previous image on a next image, based on 3D coordinates information of the matching point. The control unit 400 verifies the matching result between the feature points based on the predicted position.

Figure 4:
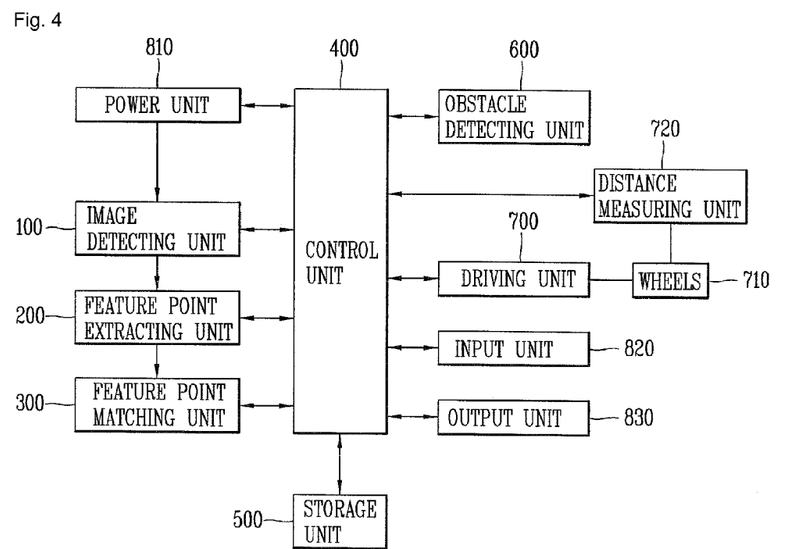

Referring to FIGS. 4 and 5, the robot cleaner according to still another embodiment of the present invention comprises an image detecting unit 100, a feature point extracting unit 200, a feature point matching unit 300, a control unit 400, a storage unit 500, a driving unit 700 configured to move the robot cleaner by driving wheels 710, and a distance measuring unit 720 connected to the wheels and configured to measure a moving distance. The same explanations as those in the aforementioned embodiment will be omitted. The driving unit 500 is configured to move the robot cleaner by driving a wheel motor for rotating a plurality of main wheels and one or more auxiliary wheels. While being moved by the driving unit 700, the robot cleaner detects a plurality of images through the image detecting unit 100. As the distance measuring unit 720, mainly used is an encoder connected to the wheel motor for driving the wheels of the robot cleaner, and configured to detect a speed. Alternatively, as the distance measuring unit 720, may be also used an acceleration sensor configured to recognize a speed and a position, a gyro sensor configured to detect a rotation speed of the robot cleaner, etc. The control unit 400 verifies a matching result through the feature point matching unit 300 based on a moving distance measured by the distance measuring unit 720, and recognizes a position of the robot cleaner based on the matching result.

Referring to FIG. 5, the control unit 400 may further include a compensation constant creating module 430 configured to create a compensation constant with respect to the similarity based on the moving distance. The similarity calculating module 410 may be configured to re-calculate the similarity based on the compensation constant, and to recognize a position of the robot cleaner based on feature points having a maximum re-calculated similarity. Here, the compensation constant indicates a constant by which a distance between the feature points is to be multiplied according to a moving distance of the robot cleaner.

Figure 7:
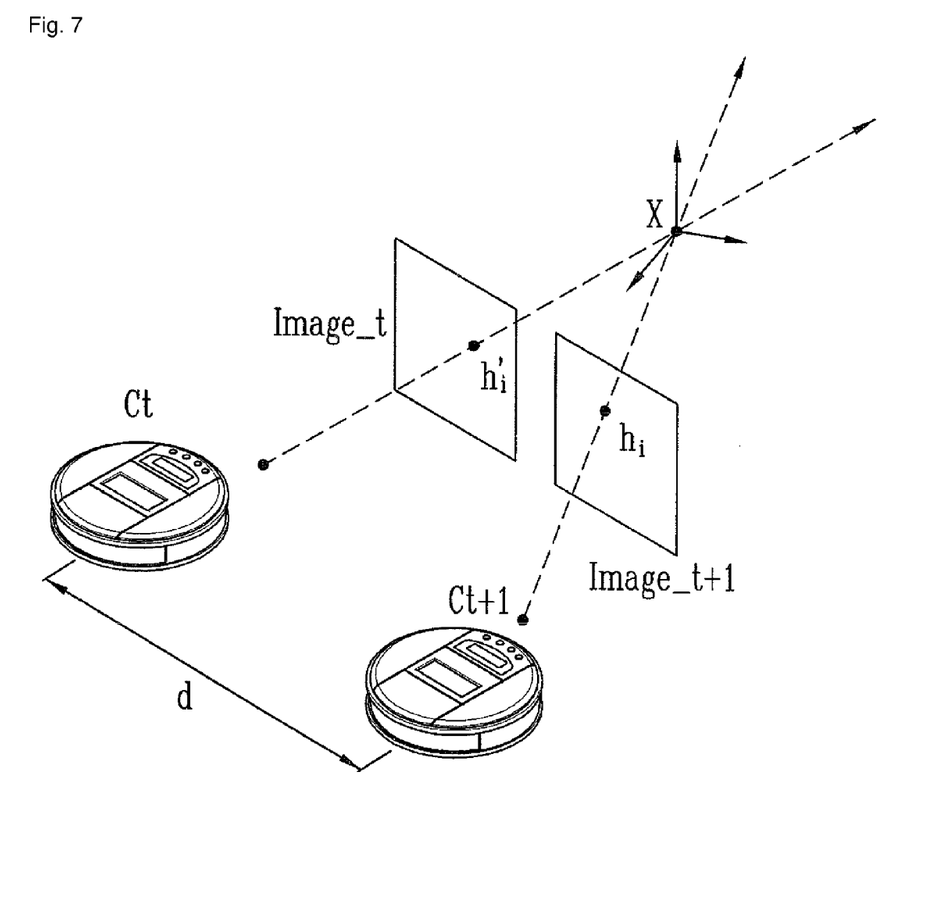
FIG. 7 is a view for explaining an operation to recognize a position of a robot cleaner according to the present invention.

Hereinafter, an operation to recognize a position of the robot cleaner will be explained with reference to FIG. 7. The similarity calculating module 410 calculates a distance between feature points based on 2D coordinates information of the feature points, and calculates a similarity based on the calculated distance between the feature points. The control unit 400 matches the feature points with each other based on the similarity, and recognizes a position change of the robot cleaner based on the matching result. The distance measuring unit 720 connected to the wheels is configured to measure a moving distance of the robot cleaner. The control unit 400 verifies whether the matched feature points exist within an error range, with reference to the moving distance measured by the distance measuring unit 720. More concretely, the compensation constant creating module 430 creates a compensation constant with respect to the similarity based on a moving distance. And, the similarity calculating module 410 re-calculates the similarity based on the created compensation constant. The control unit 400 recognizes a position of the robot cleaner based on feature points having a maximum re-calculated similarity. For instance, when a moving distance (d) of FIG. 7 is less than a predetermined reference value, it is determined that the robot cleaner has not moved. Accordingly, a distance between feature points is multiplied by a compensation constant of '1'. On the other hand, when a moving distance (d) of FIG. 7 is more than a predetermined reference value, the distance between feature points is multiplied by a compensation constant of '2'.

Referring to FIG. 4 or 5, the robot cleaner further includes an obstacle detecting unit 600 configured to detect a peripheral obstacle. The control unit 400 is configured to create a map based on the detected obstacle, and to establish (set) a cleaning path or a running path based on the map. The control unit 400 is configured to correct the cleaning path or the running path based on the position of the robot cleaner, and to perform a cleaning operation based on the corrected cleaning path or to run based on the corrected running path.

The obstacle detecting unit 600 is configured to detect an obstacle in the vicinity of the robot cleaner while the robot cleaner is moving at an indoor room such as a house or an office, and to transmit obstacle information including the existence of an obstacle, a position, a size, etc. to the control unit 400. As the obstacle detecting unit 600, may be used an infrared ray sensor, a supersonic wave sensor, a radio frequency (RF) sensor, a bumper, etc. Alternatively, the obstacle detecting unit 600 may be implemented as a position sensitive device (PSD) sensor capable of precisely calculating a distance with using a supersonic wave sensor or an infrared ray triangulation. The obstacle detecting unit 600 may measure a distance between the robot cleaner and a wall surface with using a laser range finder (LRF) for measuring a precise distance by detecting a laser which is reflected after being emitted. Based on the measured distance between the robot cleaner and a wall surface, the obstacle detecting unit 600 may detect a type, a position, etc. of the wall surface. Obstacle information acquired through the obstacle detection unit 600 may be stored in the storage unit 500.

The control unit 400 may be configured to create a map based on the obstacle information acquired through the obstacle detection unit 600, and to establish (set) a cleaning path or a running path based on the map.

The control unit 400 may be configured to correct the cleaning path or the running path based on a position recognized through a matching result between feature points, and based on a position verified with using a matching point or a moving distance, and to perform a cleaning operation based on the corrected cleaning path or to run based on the corrected running path.

The robot cleaner may further include a power unit 810 having a chargeable power supply means and configured to supply power into the robot cleaner. The power unit 810 supplies power necessary for the robot cleaner to move and to perform a cleaning operation. If a current amount remaining in the power supply means (i.e., battery) of the power unit 810 is deficient, the power unit 810 receives a charging current from a charging plate.

The robot cleaner may further include an input unit 820 configured to directly input a control command, or to input a command for instructing output of obstacle information or information stored in the storage unit 500. The input unit 820 includes an OK button for certifying position information such as a position of an obstacle and a position of the robot cleaner, or a map and a cleaning map or a running path. The input unit 820 may be further provided with at least one of a set button for inputting a setting command, a re-set button for inputting a re-setting command, a deletion button, a cleaning start button and a stop button.

The robot cleaner may further include an output unit 830 configured to display images stored in the storage unit 500, feature point information, obstacle information, or a map created by the control unit 400. The output unit 830 may be configured to further display state information including a current state of each component of the robot cleaner, a current cleaning state, etc. The output unit 830 may be implemented as one of a Light Emitting Diode (LED), a Liquid Crystal Display (LCD), a Plasma Display Panel (PDP) and an Organic Light Emitting Diode (OLED).

A user may input a control command through the input unit 820, thereby selecting a sector or a room requiring a cleaning operation from a map displayed on the output unit 830. And, the user may input a control command for establishing (setting) a cleaning pattern, a cleaning order, etc. The input unit 820 and the output unit 830 may be implemented in the form of a touch screen on which both an input and an output can be implemented.

The robot cleaner may further include a cleaning unit (not shown). The cleaning unit is provided with a suction motor for sucking air and a means for collecting dust, thereby sucking peripheral dust or foreign materials.

Figure 8:
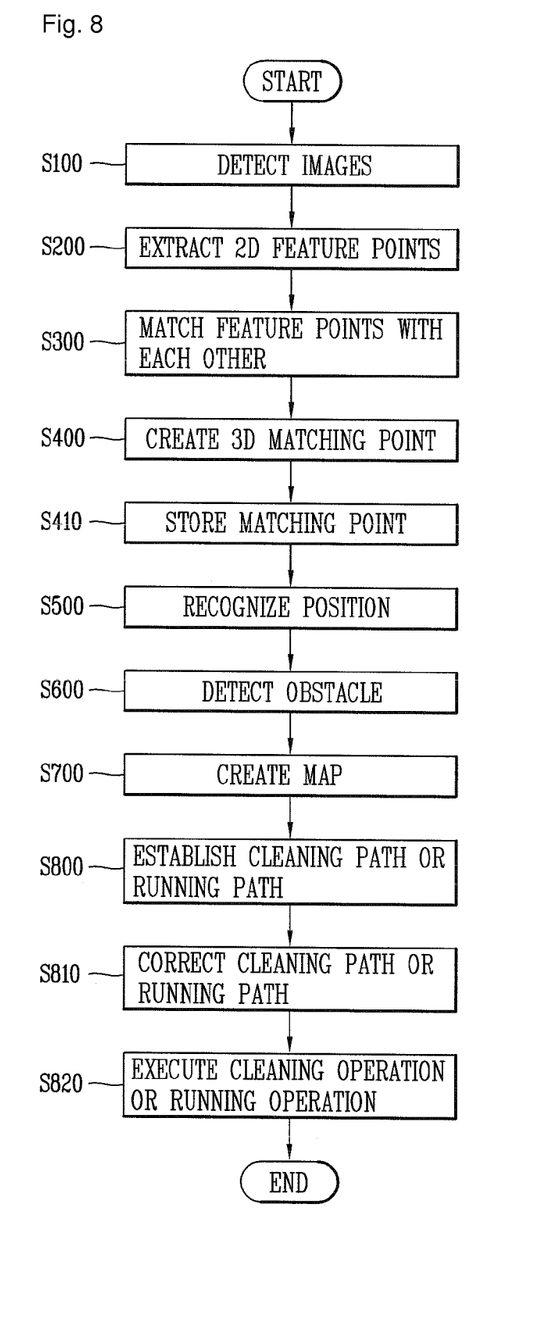
FIGS. 8 to 10 are flowcharts schematically illustrating a method for controlling a robot cleaner according to the present invention.

Referring to FIG. 8, a method for controlling a robot cleaner according to a first embodiment of the present invention comprises an image detecting step (S100) of detecting a plurality of images by capturing peripheral circumstances, a feature point extracting step (S200) of extracting one or more feature points having 2D coordinates information with respect to each of the plurality of images, a feature point matching step (S300) of matching the feature points with each other by comparing the 2D coordinates information of the feature points with each other, a matching point creating step (S400) of creating a matching point having 3D coordinates information based on a matching result through a feature point matching unit, and a position recognizing step (S500) of recognizing a position of the robot cleaner based on the created matching point. The method may further comprise a storing step (not shown) of storing the matching point having 3D coordinates information. Hereinafter, a configuration of the robot cleaner will be explained in more details with reference to FIGS. 1 to 7.

Firstly, the robot cleaner is configured to detect a plurality of images through the image detecting unit such as an upper camera for detecting an upper image by capturing an upper side, or a front camera for detecting a front image by capturing a front side (S100). Then, the robot cleaner extracts feature points from a plurality of images including a ceiling positioned at an upper side, a fluorescent lamp positioned at a front side and an interior structure (S200). The robot cleaner calculates a similarity by calculating a distance between feature points, and matches the feature points with each other based on the calculated similarity (S300). Here, the distance indicates not a substantial distance, but a distance on a feature point space. The feature points have a large similarity when a distance therebetween is short. On the other hand, the feature points have a small similarity when a distance therebetween is long. The 2D coordinates information includes feature point information consisting of a position, an orientation and a descriptor of the feature point on the image, and the descriptor indicates extraction information of the feature point.

The robot cleaner creates a matching point having 3D coordinates information based on the matching result (S400), and stores the created matching point (S410). The robot cleaner recognizes a position thereof based on the matching point. Firstly, the robot cleaner calculates a similarity between feature points based on a distance between the feature points, with using 2D coordinates information of the feature points. Also, the robot cleaner matches the feature points with each other based on the calculated similarity, and recognizes a position change thereof based on a matching result between the feature points. Then, the robot cleaner verifies the matching result between the feature points based on 3D coordinates information of the matching point. The robot cleaner creates a conversion matrix by using the matching points, and stores the created conversion matrix therein.

By using the conversion matrix, the robot cleaner converts feature points having 2D coordinates information and contained in a plurality of images, into corresponding matching points having 3D coordinates information. More concretely, the robot cleaner converts a 2D coordinates system into a 3D coordinates system by using the conversion matrix. Then, the robot cleaner verifies the matching result between the feature points based on 2D coordinates information, with using matching points on the converted 3D coordinates system.

Figure 9:
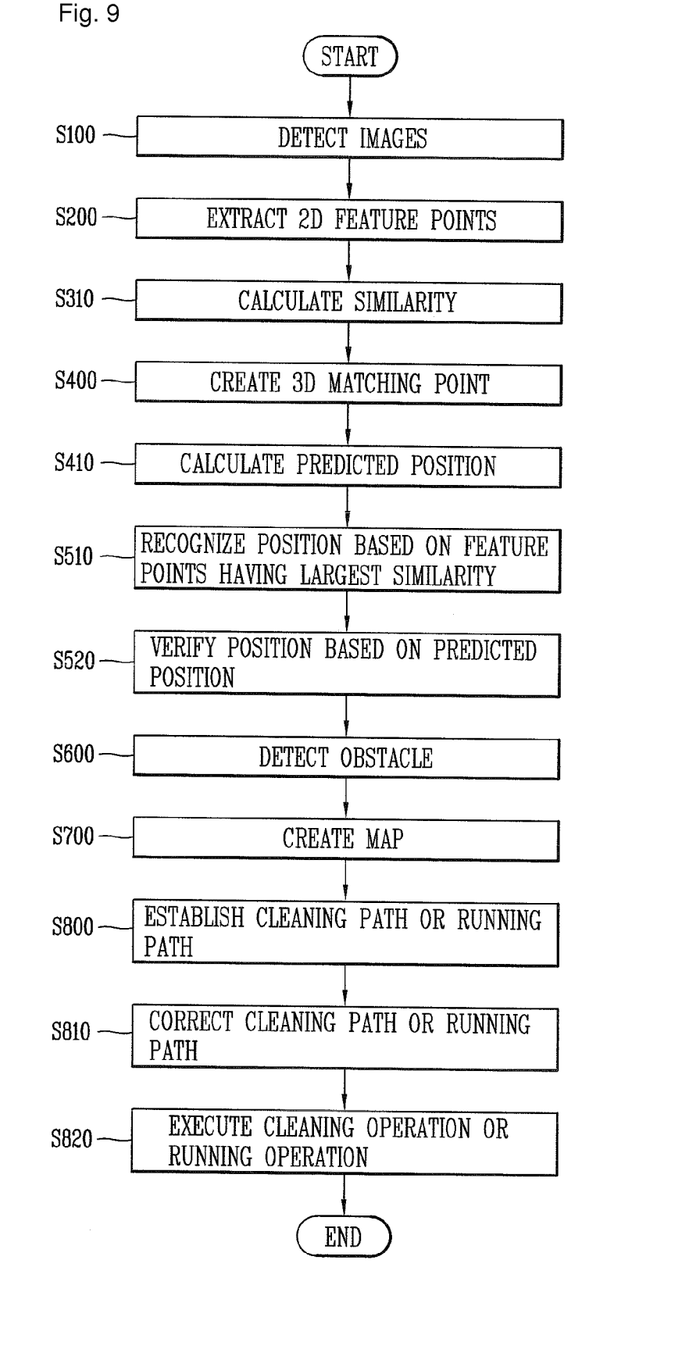

Referring to FIG. 9, the feature point matching step (S300) includes calculating a similarity between a plurality of feature points inside two or more images based on the 2D coordinates information (S310). The position recognizing step (S500) includes recognizing a position of the robot cleaner based on feature points having a maximum similarity therebetween (S510).

Referring to FIG. 9, a method for controlling a robot cleaner according to another embodiment of the present invention comprises an image detecting step (S100), a feature point extracting step (S200), a feature point matching step (S300), a matching point creating step (S400), a position recognizing step (S500) and a storing step (not shown). The method further comprises a predicted position calculating step (S410) of calculating a predicted position of a feature point of a current image on a next image, based on the matching point. The position recognizing step (S500) further includes verifying the recognized position of the robot cleaner, based on the predicted position calculated by the predicted position calculating step (S520).

The robot cleaner recognizes a position thereof based on the matching point. Firstly, the robot cleaner calculates a similarity between feature points based on a distance between the feature points with using 2D coordinates information of the feature points. Also, the robot cleaner matches the feature points with each other based on the calculated similarity, and recognizes a position change of the robot cleaner based on the matching result between the feature points. Then, the robot cleaner calculates a predicted position of a feature point of a previous image on a next image, based on 3D coordinates information of the matching point (S410). And, the robot cleaner verifies the matching result between the feature points based on the predicted position (S420).

Figure 10:
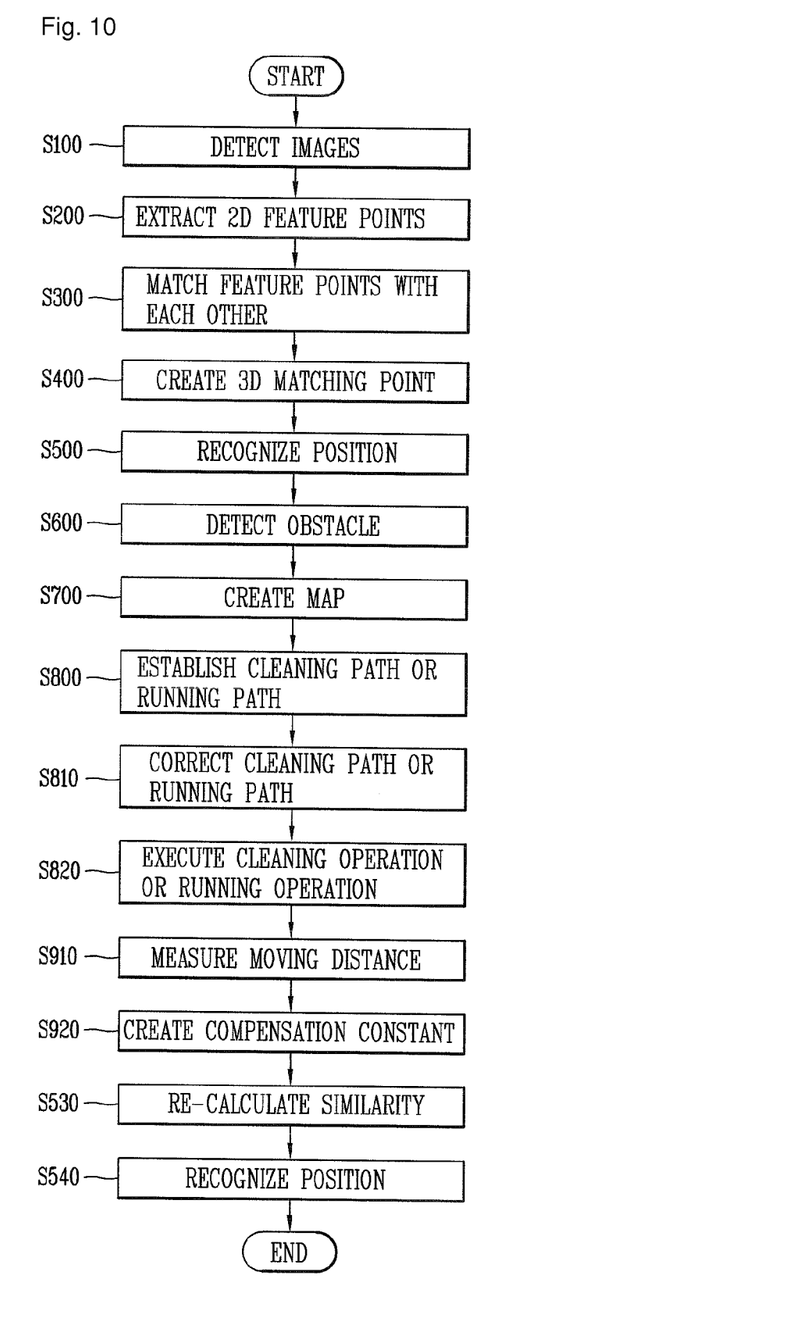

Referring to FIG. 10, a method for controlling a robot cleaner according to still another embodiment of the present invention may further comprise a moving distance measuring step (S910) of measuring a moving distance with using a sensor connected to wheels, and a compensation constant creating step (S920) of creating a compensation constant with respect to the similarity based on the moving distance. The position recognizing step (S500) may include re-calculating the similarity based on the compensation constant (S510), and recognizing a position of the robot cleaner based on feature points having a maximum re-calculated similarity (S520). Here, the compensation constant indicates a constant by which a distance between the feature points is to be multiplied according to a moving distance of the robot cleaner.

Hereinafter, an operation to recognize a position of the robot cleaner will be explained with reference to FIG. 7. The robot cleaner calculates a distance between feature points based on 2D coordinates information of the feature points, and calculates a similarity based on the calculated distance between the feature points. The robot cleaner matches the feature points with each other based on the similarity (S300), and recognizes a position change thereof based on the matching result between the feature points. The robot cleaner measures a moving distance, and verifies whether the matched feature points exist within an error range, with reference to the moving distance. More concretely, the robot cleaner creates a compensation constant with respect to the similarity based on a moving distance, and re-calculates the similarity based on the created compensation constant (S510). The robot cleaner recognizes a position thereof based on feature points having a maximum re-calculated similarity (S520). For instance, when a moving distance (d) of FIG. 7 is less than a predetermined reference value, it is determined that the robot cleaner has not moved. Accordingly, a distance between feature points is multiplied by a compensation constant of '1'. On the other hand, when a moving distance (d) of FIG. 7 is more than a predetermined reference value, the distance between feature points is multiplied by a compensation constant of '2'.

Referring to FIGS. 8 to 10, the method for controlling a robot cleaner according to still another embodiment of the present invention may further comprise an obstacle detecting step (S600) of detecting a peripheral obstacle, a map creating step (S700) of creating a map based on the detected obstacle, a path establishing (setting) step (S800) of establishing a cleaning path or a running path based on the map, a patch correcting step (S810) of correcting the cleaning path or the running path based on the position of the robot cleaner, and a cleaning operation performing step or a running step (S820) of performing a cleaning operation based on the corrected cleaning path or running based on the corrected running path.

The robot cleaner is configured to detect a peripheral obstacle while moving or performing a cleaning operation (S600), and to create a map based on the detected obstacle (S700). Then, the robot cleaner establishes a cleaning path or a running path based on the map (S800). Then, the robot cleaner corrects the cleaning path or the running path based on a position recognized through a matching result between feature points, and based on a position verified with using a matching point or a moving distance (S810). And, the robot cleaner performs a cleaning operation based on the corrected cleaning path or runs based on the corrected running path (S820).

As aforementioned, in the robot cleaner and the method for controlling the same according to the present invention, one or more feature points having 2D coordinates information with respect to each of a plurality of images are extracted, and then are matched with each other. Matching points having 3D coordinates information are created to recognize a position of the robot cleaner, and the recognized position is verified based on a moving distance measured by using a sensor. This may allow a position of the robot cleaner to be precisely recognized, and allow the robot cleaner to perform a cleaning operation or a running operation by interworking the precisely recognized position with a map.

The invention claimed is:

1. A robot cleaner, comprising:
a case;
at least one of brush;
a driving unit configured to move the robot cleaner by driving wheels;
an image detecting unit configured to detect a plurality of images by capturing peripheral circumstances;
a control unit configured to extract one or more feature points having 2D coordinates information with respect to each of the plurality of images,
match the feature points with each other by comparing the 2D coordinates information of the feature points with each other,
and create a matching point having 3D coordinates information based on a matching result through the feature point matching unit, and configured to recognize a position of the robot cleaner based on the created matching point; and
a storage unit configured to store therein the matching point having 3D coordinates information.

2. The robot cleaner of claim 1, wherein the 2D coordinates information comprises a position, an orientation and a descriptor of the feature point on the image, and the descriptor indicates extraction information of the feature point.

3. The robot cleaner of claim 1, wherein the control unit is configured to calculate a similarity between a plurality of feature points inside two or more images detected through the image detecting unit based on the 2D coordinates information,
wherein the control unit is configured to recognize a position of the robot cleaner based on feature points having a maximum similarity.

4. The robot cleaner of claim 3, wherein the control unit is configured to calculate a predicted position of a feature point of a current image on a next image, based on the matching point stored in the storage unit.

5. The robot cleaner of claim 4, wherein the control unit is configured to verify the position of the robot cleaner recognized based on feature points having a maximum similarity, based on the predicted position calculated by the predicted position calculating module.

6. The robot cleaner of claim 3, further comprising:
a distance measuring unit connected to the wheels and configured to measure a moving distance.

7. The robot cleaner of claim 6, wherein the control unit is configured to create a compensation constant with respect to the similarity based on the moving distance.

8. The robot cleaner of claim 7, wherein the control unit is configured to re-calculate the similarity based on the compensation constant, and to recognize a position of the robot cleaner based on feature points having a maximum re-calculated similarity.

9. The robot cleaner of claim 1, further comprising an obstacle detecting unit configured to detect a peripheral obstacle, wherein the control unit is configured to create a map based on the obstacle, and to establish a cleaning path or a running path based on the map.

10. The robot cleaner of claim 9, wherein the control unit is configured to correct the cleaning path or the running path based on the position, and to perform a cleaning operation based on the corrected cleaning path or to run based on the corrected running path.

11. The robot cleaner of claim 1, wherein the image detecting unit is implemented as an upper camera installed above the robot cleaner, and configured to detect an upper image by capturing an upper side.

12. A method for controlling a robot cleaner, the method comprising:
an image detecting step of detecting a plurality of images by capturing peripheral circumstances;
a feature point extracting step of extracting one or more feature points having 2D coordinates information with respect to each of the plurality of images;
a feature point matching step of matching the feature points with each other by comparing the 2D coordinates information of the feature points with each other;
a matching point creating step of creating a matching point having 3D coordinates information based on a matching result through a feature point matching unit; and
a position recognizing step of recognizing a position of the robot cleaner based on the created matching point.

13. The method of claim 12, further comprising a storing step of storing the matching point having 3D coordinates information.

14. The method of claim 12, wherein the 2D coordinates information comprises a position, an orientation and a descriptor of the feature point on the image, and the descriptor indicates extraction information of the feature point.

15. The method of claim 12, wherein the feature point matching step comprises calculating a similarity between the plurality of feature points inside two or more images based on the 2D coordinates information,
   wherein the position recognizing step comprises recognizing a position of the robot cleaner based on feature points having a maximum similarity.

16. The method of claim 15, further comprising a predicted position calculating step of calculating a predicted position of a feature point of a current image on a next image, based on the matching point.

17. The method of claim 16, wherein the position recognizing step further comprises verifying the recognized position of the robot cleaner based on the predicted position calculated in the predicted position calculating step.

18. The method of claim 15, further comprising:
   a moving distance measuring step of measuring a moving distance with using a sensor connected to wheels; and
   a compensation constant creating step of creating a compensation constant with respect to the similarity based on the moving distance.

19. The method of claim 18, wherein the position recognizing step comprises:
   re-calculating the similarity based on the compensation constant; and
   recognizing a position of the robot cleaner based on feature points having a maximum re-calculated similarity.

20. The method of claim 12, further comprising:
   an obstacle detecting step of detecting a peripheral obstacle;
   a map creating step of creating a map based on the obstacle;
   a path establishing step of establishing a cleaning path or a running path based on the map;
   a path correcting step of correcting the cleaning path or the running path based on the position; and
   a cleaning or running executing step of executing a cleaning operation or a running operation based on the corrected cleaning path or running path.

* * * * *